United States Patent
Shaft et al.

(10) Patent No.: US 9,633,061 B2
(45) Date of Patent: Apr. 25, 2017

(54) METHODS FOR DETERMINING EVENT COUNTS BASED ON TIME-SAMPLED DATA

(71) Applicant: Oracle International Corporation, Redwood City, CA (US)

(72) Inventors: Uri Shaft, Fremont, CA (US); Graham Stephen Wood, El Granada, CA (US); John Beresniewicz, Half Moon Bay, CA (US)

(73) Assignee: Oracle International Corporation, Redwood City, CA (US)

( * ) Notice: Subject to any disclaimer, the term of this patent is extended or adjusted under 35 U.S.C. 154(b) by 391 days.

(21) Appl. No.: 13/627,906

(22) Filed: Sep. 26, 2012

(65) Prior Publication Data

US 2014/0089270 A1    Mar. 27, 2014

(51) Int. Cl.
*G06F 7/00* (2006.01)
*G06F 17/30* (2006.01)

(52) U.S. Cl.
CPC .. *G06F 17/30371* (2013.01); *G06F 17/30306* (2013.01)

(58) Field of Classification Search
None
See application file for complete search history.

(56) References Cited

U.S. PATENT DOCUMENTS

| | | | |
|---|---|---|---|
| 4,553,221 A * | 11/1985 | Hyatt | B60R 16/0373 702/17 |
| 6,278,989 B1 * | 8/2001 | Chaudhuri | G06F 17/30463 |
| 6,282,570 B1 * | 8/2001 | Leung | G06F 11/3409 707/999.2 |
| 6,343,295 B1 * | 1/2002 | MacLeod | G06F 17/30368 |
| 6,804,627 B1 * | 10/2004 | Marokhovsky et al. | 702/182 |
| 2003/0088542 A1 * | 5/2003 | McGee | G06F 11/323 |
| 2005/0159835 A1 * | 7/2005 | Yamada | G06Q 10/06 700/109 |
| 2005/0183127 A1 * | 8/2005 | Ngo | H04N 7/17336 725/90 |

* cited by examiner

*Primary Examiner* — Debbie Le
*Assistant Examiner* — Hasanul Mobin
(74) *Attorney, Agent, or Firm* — Martine Penilla Group, LLP

(57) ABSTRACT

A method for determining event counts for a database system includes capturing samples for the active sessions based on a pre-defined sampling frequency and identifying events from the captured samples. The method further includes determining the wait time for each of the identified events and determining an event count for the active sessions using a harmonic mean. The harmonic mean is a summation of the maximum of either one or the ratio of the sampling frequency to the determined wait time for each of the identified events.

18 Claims, 7 Drawing Sheets

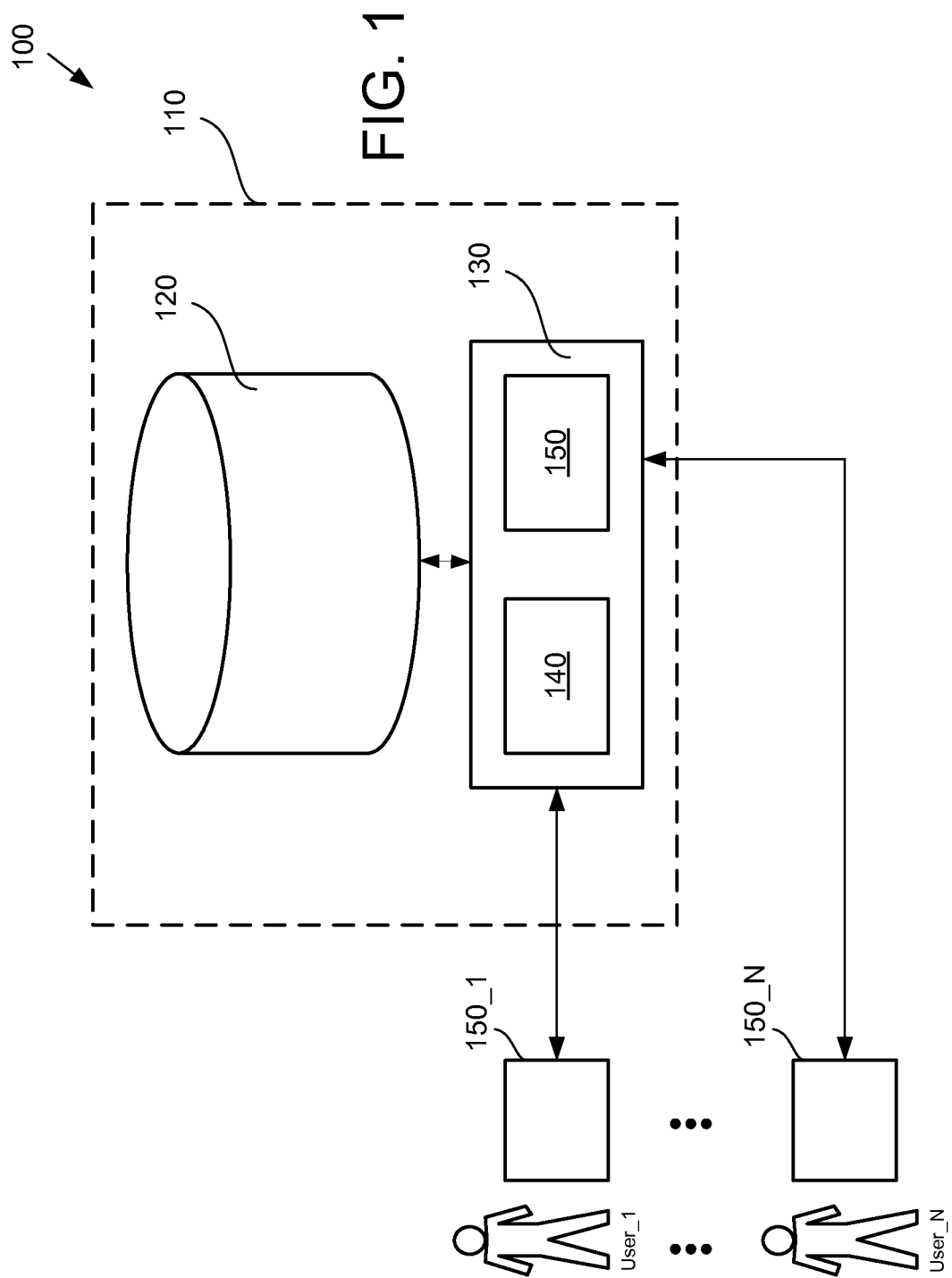

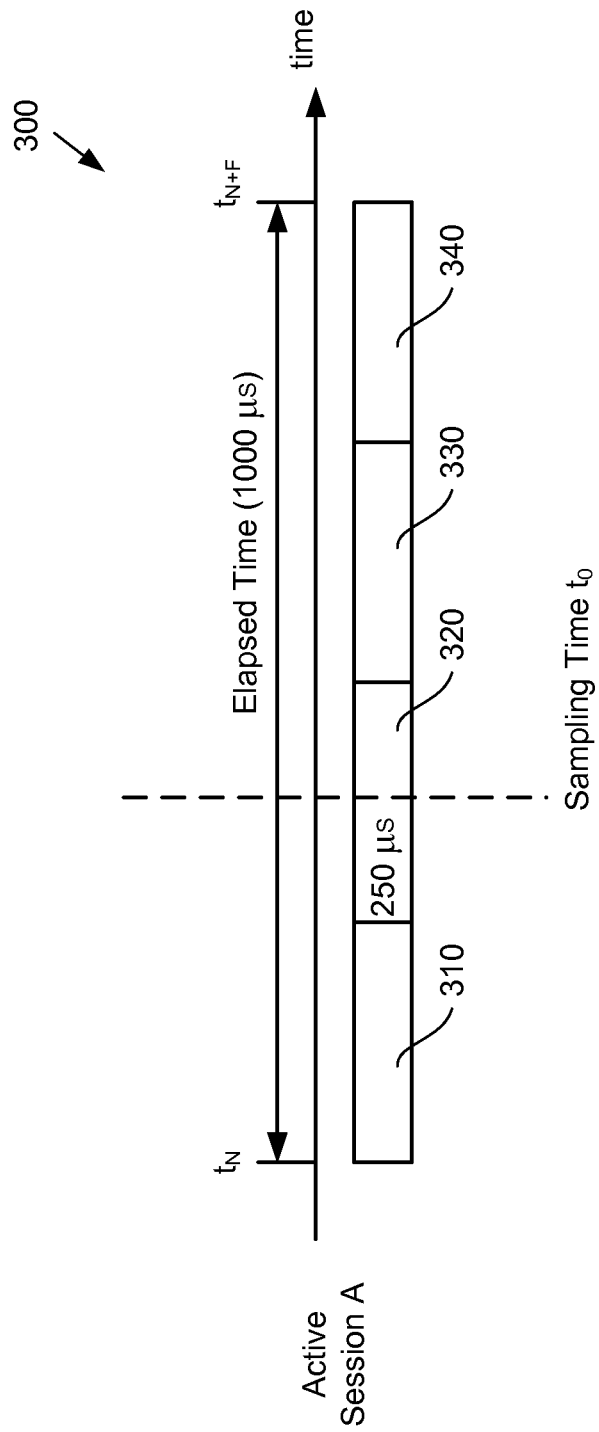

METHODS FOR DETERMINING EVENT COUNTS BASED ON TIME-SAMPLED DATA

BACKGROUND

A database is an organized collection of data, typically in digital form. As the size and complexity of database systems increase, database performance analysis plays a more and more important role. One way to analyze the performance of a database is to sample information for various activities in the database according to a sampling frequency. Thus, the time spent in the database on various types of activities can be estimated by multiplying the number of samples with the sampling frequency. However, an activity may include many separate short or long events. Many database users or developers have been trying to estimate the number of events based on the averaged sampled event times. Because the frequency based sampling method is extremely biased toward long events, the estimated event counts obtained by the above-mentioned method are often not reliable.

It is within this context that embodiments arise.

SUMMARY

Embodiments set forth in this disclosure provide methods and systems for determining event counts for active sessions in a database system. The present embodiments can be implemented in numerous ways, such as a process, an apparatus, a system, a device or a method on a computer readable non-transitory medium. Several embodiments are described below.

In one embodiment, a first method for determining event counts for a database system is provided. In this method, samples for the active sessions are captured based on a pre-defined sampling frequency and events are identified from the captured samples. The wait time for each of the identified events is determined and an event count for the active sessions is determined using a harmonic mean. The harmonic mean is a summation of the maximum of either one or the ratio of the sampling frequency to the determined wait time for each of the identified events. The determined event count for each group is output, e.g, for a display or as a file. In one embodiment, the pre-defined sampling frequency is about one sampling per second.

In another embodiment, a second method for determining event counts for a database system is provided. In this method, samples for active sessions are captured based on a pre-defined sampling frequency, events are identified from the captured samples, and the wait time for each of the identified events is determined. The identified events may be grouped based on the determined wait time according to defined wait time ranges. Then, a group event count for each group of the identified events is determined using a harmonic mean that is a summation of the maximum of either one or the ratio of the sampling frequency to the determined wait time for each of the identified events in each group. The determined group event count is output, e.g., for a display or as a file.

In yet another embodiment, a computer program embedded in a non-transitory computer-readable storage medium is provided. The computer program, when executed by one or more processors, may perform the operations of capturing samples for the active sessions based on a pre-defined sampling frequency and identifying events from the captured samples. The computer program may further perform the operations of determining the wait time for each of the identified events and determining an event count for the active sessions using a harmonic mean. The harmonic mean is a summation of the maximum of either one or the ratio of the sampling frequency to the determined wait time for each of the identified events.

Other aspects of the invention will become more apparent from the following detailed description, taken in conjunction with the accompanying drawings, illustrating by way of example embodiments of the present invention.

BRIEF DESCRIPTION OF THE DRAWINGS

FIG. 1 illustrates a system for capturing time-sampled data for a database system, in accordance with one embodiment of the present invention.

FIG. 3 is a diagram illustrating a sampling for short events, in accordance with one embodiment of the present invention.

DETAILED DESCRIPTION

Figure 2A:
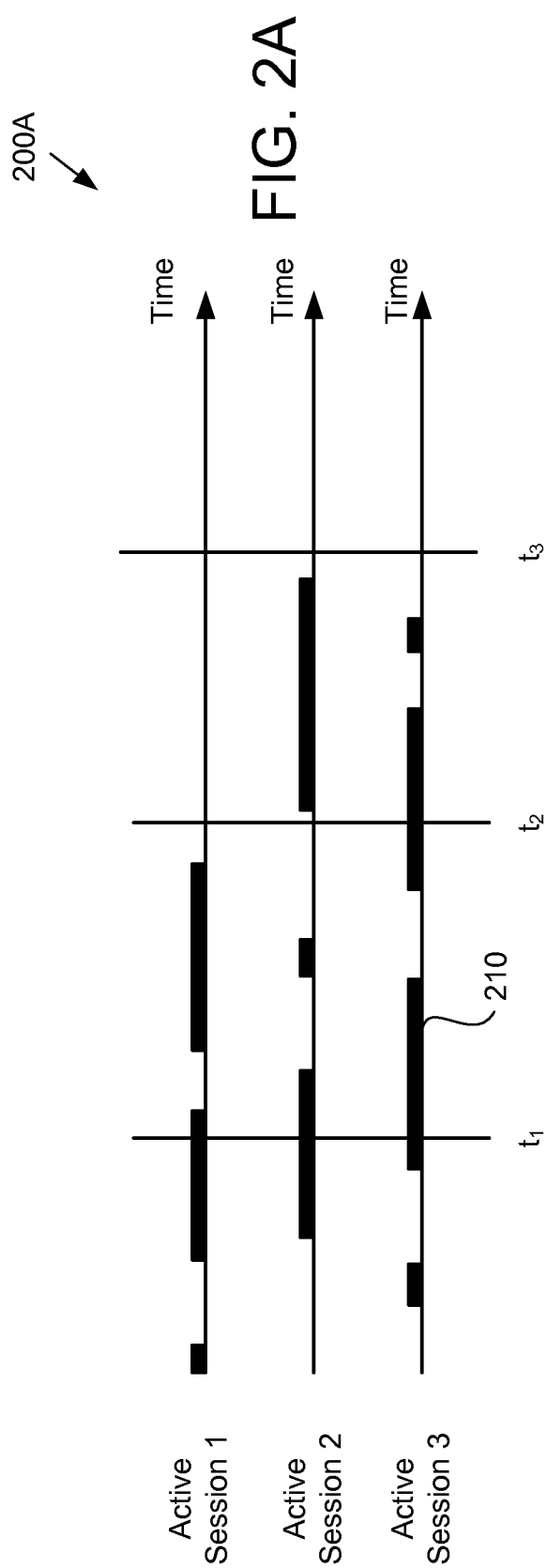
FIGS. 2A and 2B respectively illustrate a sampling diagram and a sampling data table, in accordance with one embodiment of the present invention.

The following embodiments relate to methods and systems for determining event counts based on time-sampled data in a database system. It should be appreciated that the present invention can be implemented in numerous ways, including as a process, an apparatus, a system, a device, or a method. Several exemplary embodiments of the invention will now be described in detail with reference to the accompanying drawings. In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

FIG. 1 illustrates a system 100 for capturing time-sampled data for a database system, in accordance with one embodiment of the present invention. The system 100 includes a database system 110 and a plurality of user devices (150_1 . . . 150_N). Each of a plurality of users (User_1 . . . User_N) may access the database system 110 via a corresponding user device.

As shown in FIG. 1, the database system 110 includes a database 120 and a database server 130. Database server 130 further includes a user access module 140 and a database sampler 150. A user may send database access requests, via his or her user device, to database server 130 for any database operations. The operations to be performed in database 120 may include reading data from database 120 and writing data to database 120. The database access requests sent by various users may be received by user access module 140 of database server 130, and user access module 140, in turn, will connect to database 120 to process the received user database access requests.

In one embodiment, once a user is connected with database 120, a user session (or simply "session") associated with the user is established. An active session is a session that is either actively using a CPU to process a database command or actively waiting for a resource while in the middle of a database process. Thus, an active session may alternate between CPU processing of a database command and waiting for a resource. Each time an active session actively waits for a resource is considered to be an event. An inactive session is an idle session, waiting for the next user database access request. For example, when a user is viewing the search results on a shopping cart of a shopping website, the session associated with the user is considered to be an inactive session.

In one embodiment, database sampler 150, which is part of database server 130, is used to capture time-sampled data for active sessions. The time-sampled data samples (or simply "samples") are captured continuously for active sessions at uniform time intervals based on a pre-defined sampling frequency. The captured samples may be recorded as a sequence of snapshots of information for activities in database 120 over time. The captured sequence of snapshots may be very useful in diagnosing a database performance problem, as will be explained in more detail below. In one embodiment, the pre-defined sampling frequency is about one sampling per second. Thus, each captured sample represents 1 second of the activity for an active session.

In one embodiment, database sampler 150 may be configured to scan the captured samples to determine the activity type for each of the captured samples. Based on the determined activity type of a captured sample, database sampler 150 may identify whether the captured sample is an event. For example, if the activity type of a captured sample for an active session is "CPU" (e.g., the active session is using the CPU to process a command), the captured sample is not considered to be an event. In another example, if the activity type of a captured sample for an active session is "I/O" (e.g., the active session is waiting for an I/O resource), the captured sample is an event, and more specifically, an I/O event.

In one embodiment, if the captured sample is an event, database sampler 150 may be further configured to determine the wait time for the event. In one embodiment, database sampler 150 may be configured to hold off on the determination of the wait time for an event until the event is completed. For example, database sampler 150 may determine whether the event has been completed by checking whether the current sample is the last sample for this event. The determined information for the captured samples along with the captured samples may be stored by database sampler 150 in a data storage device in database system 110.

In one embodiment, database sampler 150 may be further configured to use a harmonic mean to determine the event count for the samples captured during a specified time period. The harmonic mean is a summation of the maximum of either one or the ratio of a sampling frequency to the wait time for each identified event. Thus, the event count for all captured samples can be estimated by the following harmonic mean:

Estimated Event Count=Σmax(1,sampling frequency/ wait time of an event).

Figure 2B:
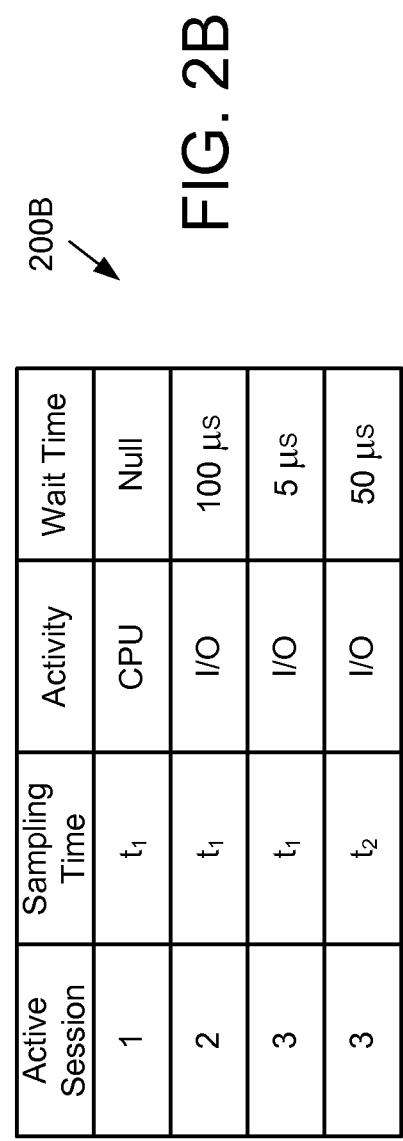

FIGS. 2A and 2B respectively illustrate a sampling diagram 200A and a sampling data table 200B, in accordance with one embodiment of the present invention. Although FIG. 2A shows three active sessions, it is to be understood that in practice, the number of active sessions that may be engaged in a database system can vary. The arrows in FIG. 2A indicate the time lines. Each solid rectangular bar represents an activity for a respective active session. Each activity may include a plurality of separate events. For example, activity 210 for active session 3 may represent a single block read I/O that includes a plurality of I/O events.

As shown in FIG. 2A, three samplings are performed respectively at sampling times $t_1$, $t_2$, and $t_3$, based on a pre-defined sampling frequency. At sampling time $t_1$, three samples are captured (one for each active session). At sampling time $t_2$, because active sessions 1 and 2 are not involved in activities at sampling time $t_2$, one sample is captured for active session 3. At sampling time $t_3$, because all of the active sessions are not involved in activities at sampling time $t_3$, no samples are captured. In one embodiment, the three samplings are conducted by database sampler 150 installed in database server 130, as shown in FIG. 1.

The sampling data table 200B in FIG. 2B shows the captured samples along with the activity information determined for each of the captured samples. If a captured sample is determined to be an event, the database sampler 150 is further configured to determine the wait time for this event. For example, for the samples captured at sampling time $t_1$, the sampler may determine that the captured sample for active session 1 is using a CPU to process a command, and the captured samples for active session 2 and active session 3 are waiting to read information from disks. Thus, the activity type for the captured sample for active session 1 at sampling time $t_1$ is listed in table 200B as "CPU" and the activity type for each of the captured samples for active session 2 and active session 3 is listed as "I/O." Based on the determined activity types, the database sampler 150 may determine that the captured samples for active session 2 and active session 3 are events. In one embodiment, the database sampler 150 determines the wait time for each event. In the case of active session 1, since the captured sample for this session at the sampling time $t_1$ is not an event, the sampler may assign "Null" to the wait time for this sample as shown in table 200B.

In one embodiment, if a captured sample is an event having a wait time shorter than the sampling frequency, the event is considered to be a short event. A short event may or may not be captured by the database sampler 150. In contrast, a long event is an event having a wait time longer than the sampling frequency. Consequently, a long event may be sampled multiple times. Thus, it can be appreciated that sampling techniques are biased toward long events.

FIG. 3 is a diagram 300 illustrating the sampling of short events, in accordance with one embodiment of the present invention. In this embodiment, the sampling frequency F is one sampling per second, and the dashed line shown in FIG. 3 represents the sampling time $t_0$. As shown in FIG. 3, active session A includes four short events during the elapsed time (from $t_N$ to $t_{N+F}$), event 310, event 320, event 330, and event 340. At the sampling time $t_0$, the captured event is event 320. Because event 320 is a short event that has a wait time shorter than the sampling frequency, event 320 ends after the sampling taken at the sampling time $t_0$. Thus, the wait time for event 320 is determined after this sampling. In this example, the determined wait time for the sampled event 320 is 250 microseconds.

In one embodiment, the event count, i.e., the number of events represented by the captured sample during the elapsed time period, can be estimated by taking the ratio of the sampling frequency to the wait time for the event in the captured sample. For example, the event count for active session A can be estimated by dividing the sampling frequency (1000 microseconds) by the wait time (250 microseconds) of the event in the captured sample, i.e., 4 events.

Figure 4:
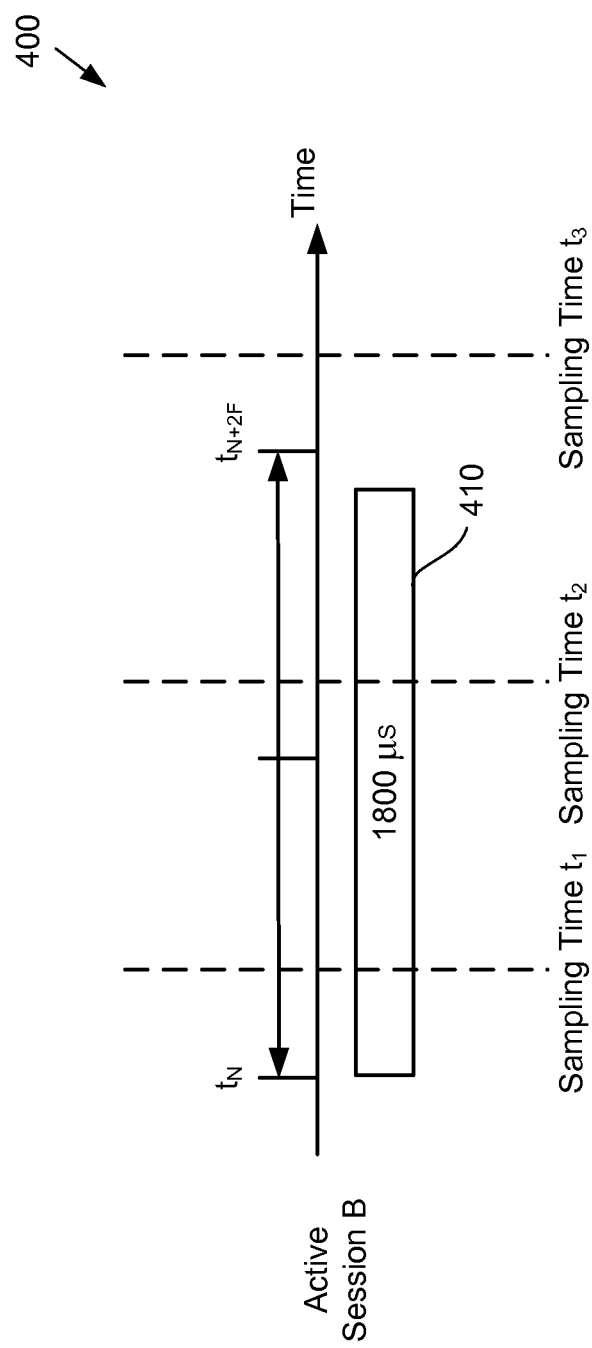
FIG. 4 is a diagram illustrating multiple samplings for a long event, in accordance with one embodiment of the present invention.

FIG. 4 is a diagram 400 illustrating the sampling of a long event, in accordance with one embodiment of the present invention. In this embodiment, the sampling frequency F is one sampling per second. As shown in FIG. 4, active session B includes an event 410 that is sampled twice at the sampling times $t_1$ and $t_2$. After the sampling taken at sampling time $t_1$, the wait time for event 410 is not determined, e.g., by the database sampler 150, because the event has not been completed. As shown in FIG. 4, event 410 ends after the sampling taken at the sampling time $t_2$. Thus, the sample captured at the sampling time $t_2$ is the last sample for event 410. In this embodiment, the database sampler 150 is used to determine the wait time for event 410. Because the determined wait time for event 410 is 1800 microseconds, which is longer than the sampling frequency of 1000 microseconds, event 410 is considered to be a long event. In one embodiment, a database sampler may determine whether an event has been completed by checking whether the captured sample is the last sample for this event. For example, the database sampler 150 may determine that event 410 is completed after the sampling taken at the sampling time $t_2$ based on the fact that event 410 is not sampled at the sampling time $t_3$. For the long event 410, the estimated event count for the elapsed time period (from $t_N$ to $t_{N+2F}$) is the one (1).

Embodiments of the present invention provide many advantages. For example, the estimated event count can help to distinguish whether the increased wait time in a database system is due to the increased latency (e.g., increased wait time for one event) or due to the increased number of events. In another example, the estimated event count may be used to obtain the average wait time per event. The total time spent in a database by all active sessions can be estimated by multiplying the sampling frequency with the total number of captured samples for all active sessions. Thus, the average wait time per event can be obtained by dividing the total time spent in the database with the estimated event count. In yet another example, the estimated event count can be used to generate an event histogram based on the defined wait time ranges and the estimated event counts, which can be useful in diagnosing various database performance problems.

Figure 5:
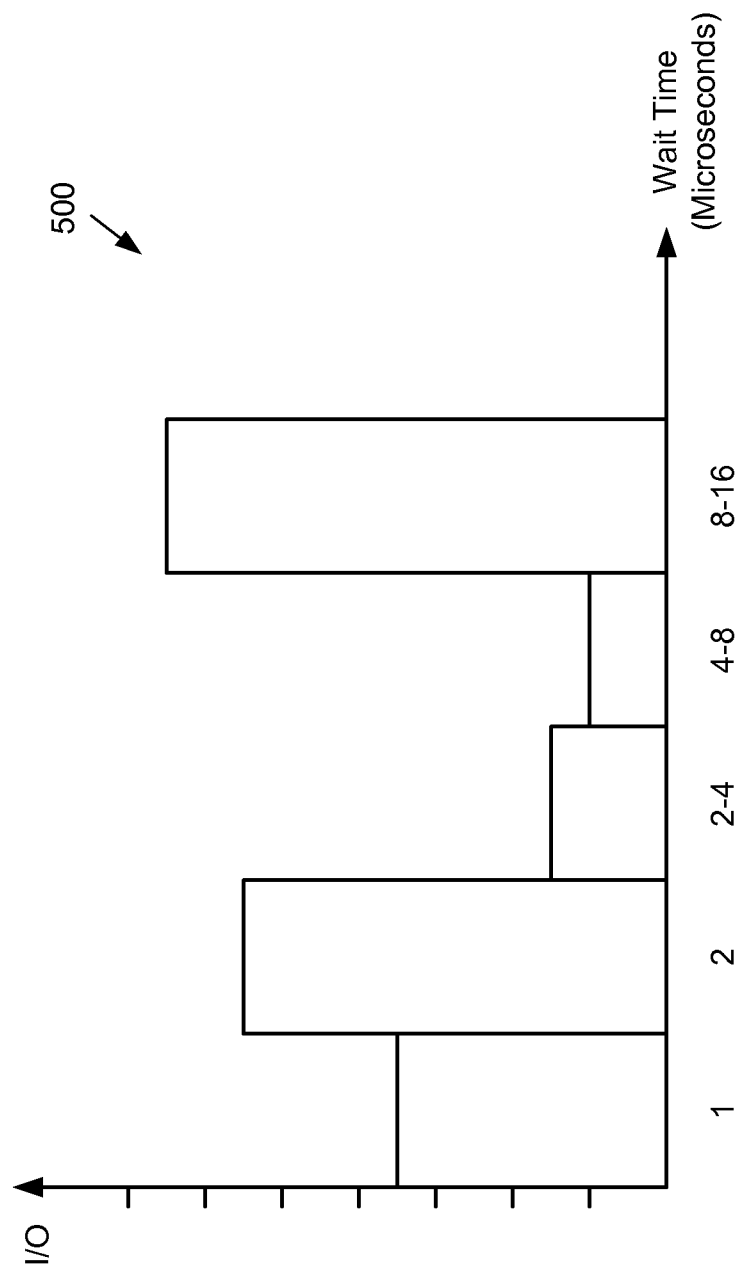
FIG. 5 is an I/O histogram illustrating I/O events grouped according to defined wait time ranges, in accordance with one embodiment of the present invention.

FIG. 5 is an I/O histogram 500 illustrating I/O events grouped according to defined wait time ranges, in accordance with one embodiment of the present invention. In one embodiment, after the activity types for all of the captured samples are identified, the events can be categorized based on determined activity types. In this embodiment, the events are I/O events. The I/O events may be grouped based on the determined wait time according to defined wait time ranges. In this embodiment, the defined wait time ranges are 1 microsecond, 2 microseconds, 2-4 microseconds, 4-8 microseconds, and 8-16 microseconds, respectively. After the identified I/O events having the wait time of 1 microsecond, 2 microseconds, 2-4 microseconds, 4-8 microseconds, and 8-16 microseconds are respectively grouped together, the estimated group event count for each group of events may be determined by using the harmonic mean method described above. Based on the determined I/O event count for each group, a histogram of the I/O events can be created.

Alternatively, a histogram may be created for all identified events from the captured samples. After the database sampler determines the wait time for each identified event, all of the identified events may be grouped based on the defined wait time ranges. Then, a group event count may be determined for each group of identified events using the harmonic mean. A histogram for all identified events may be determined based on the determined group event count and the defined wait time ranges.

Figure 6:
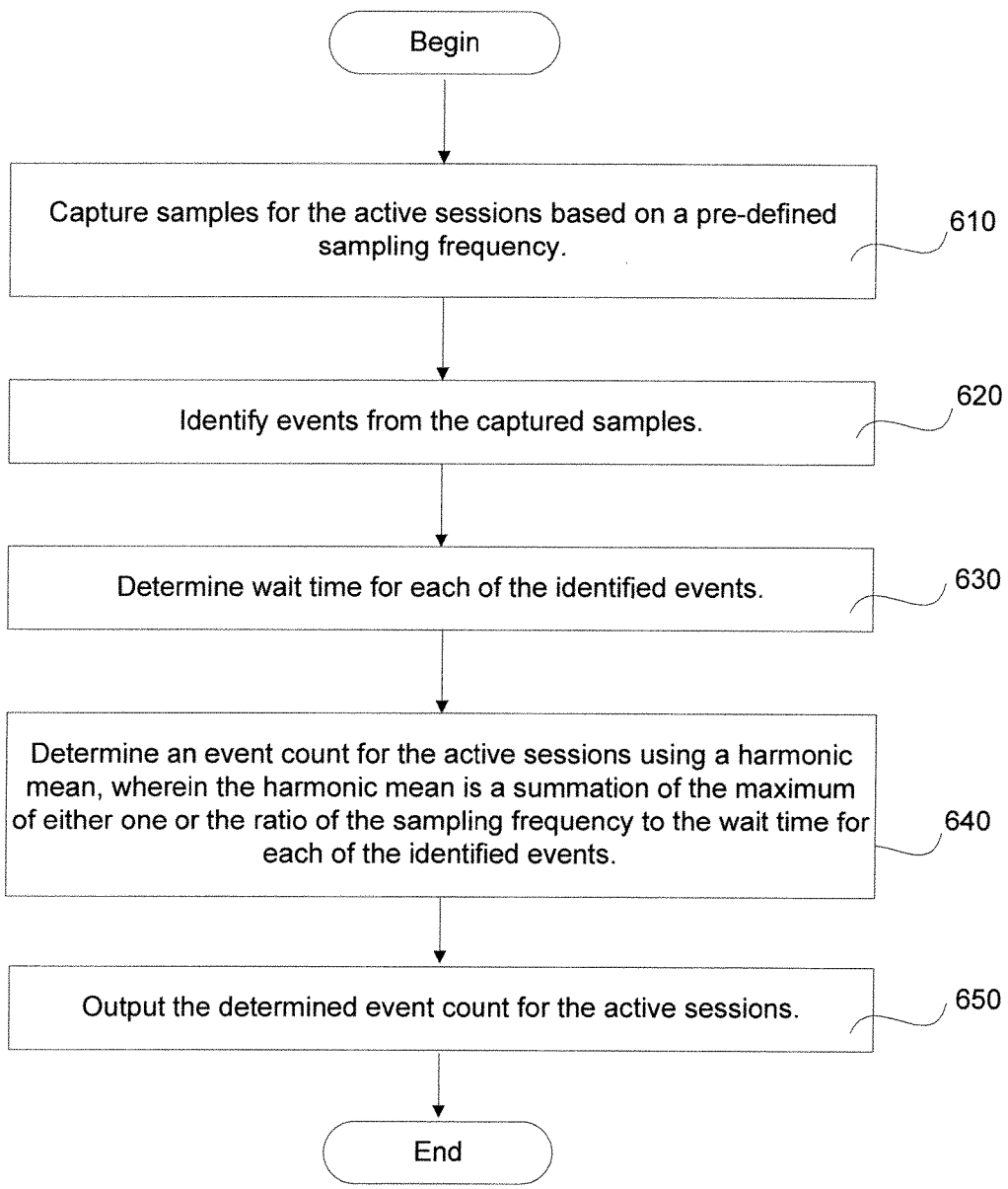
FIG. 6 is a flow chart illustrating an exemplary method for determining event counts for a database system, in accordance with one embodiment of the present invention.

FIG. 6 is a flow chart illustrating an exemplary method for determining event counts for a database system, in accordance with one embodiment of the present invention.

In operation 610, after the active sessions in a database system are identified, samples are captured for the active sessions based on a pre-defined sampling frequency. As described above, an active session is a session that is either actively using a CPU to process a database command or actively waiting for a resource while in the middle of a database process. Each time an active session waits for a resource is considered to be an event. In one embodiment, the sampling frequency is about 1 sampling per second. Thus, each captured sample represents 1 second of database activities. The captured samples may be stored in a storage device in the database system.

In one embodiment, the samples are captured by a database sampler, such as database sampler 150, as shown in FIG. 1. The database sampler may be configured to determine the type of activity for each captured sample. For example, if the captured sample is engaging a CPU to process a command, the type of activity determined for the captured sample is a "CPU" activity. In another example, if the captured sample is waiting for an I/O resource, the captured sample is an I/O event (e.g., listed as "I/O" in the table of FIG. 2B).

In operation 620, the events are identified from the captured samples. As discussed above, the database sampler that performs the sampling based on the pre-defined sampling frequency may scan the captured samples to determine the type of activity for each captured sample. In one embodiment, the events can be identified from the captured samples based on the type of activity determined for each of the captured samples.

In operation 630, after the events in the captured samples are identified, the wait time for each of the identified events is determined. In one embodiment, the database sampler determines the wait time for each of the identified events after the identified event has been completed.

In operation 640, an event count for the active sessions is determined using a harmonic mean. The harmonic mean is a summation of the maximum of either one or the ratio of the sampling frequency to the wait time for each of the identified events. In one embodiment, the type of event for the captured samples may be identified based on the determined activity types. The events with the identified type can be grouped based on the defined wait time ranges. For each type of event, a group event count may be determined by using the harmonic mean. In one embodiment, a histogram for the identified type of events may be created based on the defined wait time ranges and the determined group event count for each group of the identified type of events.

In operation 650, the determined event count is output. In one embodiment, the determined event count is output to a graphical user interface (GUI) for display, e.g., as a report for review by a database administrator. In another embodiment, the determined event count is output as a file, e.g., for use as an input for another device.

Figure 7:
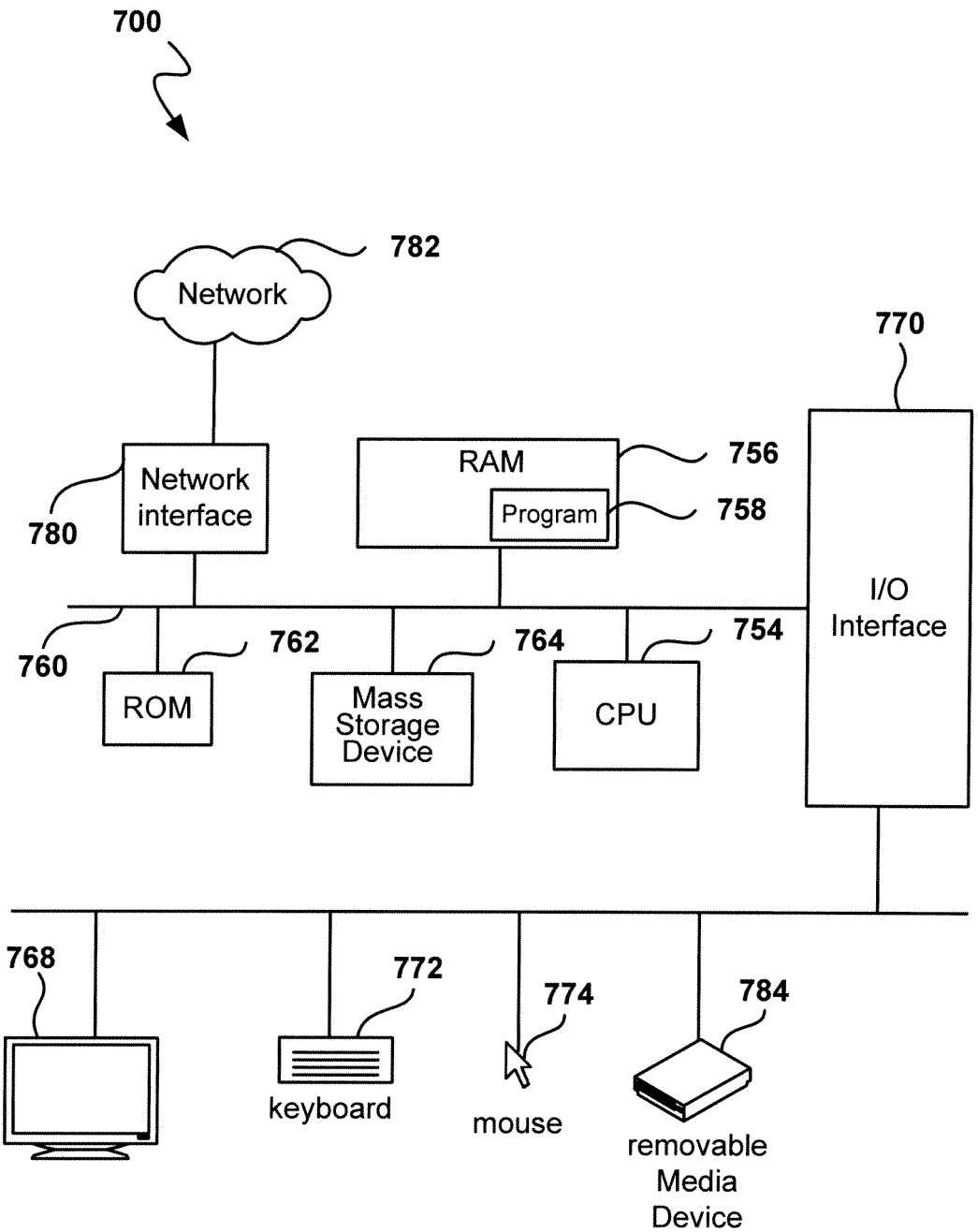
FIG. 7 is a simplified schematic diagram of a computer system for implementing embodiments described herein.

FIG. 7 is a simplified schematic diagram of a computer system 700 for implementing embodiments described herein. It should be appreciated that the methods described herein may be performed with a digital processing system, such as a conventional, general-purpose computer system. Special purpose computers, which are designed or programmed to perform only one function, may be used in the alternative. The computer system 700 includes a central processing unit (CPU) 754, which is coupled through bus 760 to random access memory (RAM) 756, read-only memory (ROM) 762, and mass storage device 764. Computer program 758 for identifying a top blocking database session resides in random access memory (RAM) 756, but can also reside in mass storage device 764.

Mass storage device 764 represents a persistent data storage device such as a floppy disc drive or a fixed disc drive, which may be local or remote. Network interface 780 provides connections via network 782, allowing communications with other devices. It should be appreciated that CPU 754 may be embodied in a general-purpose processor, a special purpose processor, or a specially programmed logic device. Input/output (I/O) interface 770 provides communication with different peripherals and is connected with CPU 754, RAM 756, ROM 762, and mass storage device 764, through bus 760. Sample peripherals include display 768, keyboard 772, cursor control or mouse 774, removable media device 784, etc.

Display 768 is configured to display the user interfaces described herein. Keyboard 772, cursor control 774, removable media device 784, and other peripherals are coupled to I/O interface 770 in order to communicate information in command selections to CPU 754. It should be appreciated that data to and from external devices may be communicated through I/O interface 770. The embodiments can also be practiced in distributed computing environments where tasks are performed by remote processing devices that are linked through a wire-based or wireless network.

Embodiments may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a network.

With the above embodiments in mind, it should be understood that the embodiments can employ various computer-implemented operations involving data stored in computer systems. These operations are those requiring physical manipulation of physical quantities. Any of the operations described herein that form part of the embodiments are useful machine operations. The embodiments also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

One or more embodiments can also be fabricated as computer readable code on a non-transitory computer readable medium. The non-transitory computer readable medium is any data storage device that can store data, which can be thereafter be read by a computer system. Examples of the non-transitory computer readable medium include hard drives, network attached storage (NAS), read-only memory, random-access memory, CD-ROMs, CD-Rs, CD-RWs, magnetic tapes and other optical and non-optical data storage devices. The non-transitory computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for determining event counts for a database system, comprising:

capturing samples for active sessions based on a pre-defined sampling frequency, the pre-defined sampling frequency defining a uniform time interval and wherein each of the captured samples identifies a type of an activity;

identifying events for each identified type of activity from the captured samples that are active during a sampling time;

determining wait time for each of the identified events;

determining an event count for the active sessions using a harmonic mean of the wait times of the identified events for each type of activity, wherein the harmonic mean is a summation of:

for events having a wait time that is greater than the pre-defined sampling frequency, one per event, and for events having a wait time that is shorter than the pre-defined sampling frequency, a ratio of the sampling frequency to the determined wait time, the harmonic mean computes the event count by estimating for events occurring in the active session with wait times shorter than the pre-defined sampling frequency, and including events with wait time greater than the sampling frequency within the active sessions; and outputting the determined event count, wherein the method is executed by a processor.

2. The method of claim 1, wherein the determining of the wait time for each of the identified events includes, determining whether each of the identified events has been completed; and obtaining the wait time for each completed event.

3. The method of claim 2, wherein the wait time for each completed event is obtained by a sampler of the database system.

4. The method of claim 1, wherein the pre-defined sampling frequency is about 1 sampling per second.

5. The method of claim 1, wherein the determining of the event counts for the active sessions includes, identifying a type of events from the captured samples based on the identified activity types;
defining wait time ranges for the identified type of events;
grouping the events with the identified type based on the defined wait time ranges; and
determining a group event count for each group of the identified type of events using the harmonic mean.

6. The method of claim 5, further comprising:
creating a histogram for the identified type of events based on the defined wait time ranges and the determined group event count for each group of the identified type of events.

7. The method of claim 1, further comprising:
identifying the active sessions in the database system.

8. The method of claim 1, wherein the samples of the active sessions are captured during a specified time period.

9. A method for determining event counts for a database system, comprising:
capturing samples for active sessions based on a pre-defined sampling frequency, the pre-defined sampling frequency defining a uniform time interval and wherein each of the captured samples identifies a type of an activity;
identifying events for each identified type of activity from the captured samples that are active during a sampling time;
determining wait time for each of the identified events;
grouping the identified events based on the determined wait time according to defined wait time ranges;
determining a group event count for each group of the identified events for the active sessions using a harmonic mean of the wait times of the identified events for each type of activity in each group, wherein the harmonic mean is a summation of:
for events having a wait time that is greater than the pre-defined sampling frequency, one per event, and
for events having a wait time that is shorter than the pre-defined sampling frequency, a ratio of the sampling frequency to the determined wait time in each group of the active sessions,
the harmonic mean computes the event count by estimating for events occurring in the active sessions with wait times shorter than the pre-defined sampling frequency, and including events with wait time greater than the pre-defined sampling frequency within each group; and
outputting the determined group event count for each group, wherein the method is executed by a processor.

10. The method of claim 9, further comprising:
creating a histogram for the identified events based on the defined wait time ranges and the determined group event count for each grouped events.

11. The method of claim 9, wherein the determining of the wait time for each of the identified events includes,
determining whether each of the identified events is completed; and
obtaining the wait time for each completed event.

12. The method of claim 11, wherein the wait time for each completed event is obtained by a sampler of the database system.

13. The method of claim 9, wherein the pre-defined sampling frequency is about 1 sampling per second.

14. The method of claim 9, further comprising:
identifying the active sessions in the database system.

15. A non-transitory computer-readable storage medium storing program instructions, which when executed by one or more processors, performs the following operations:

capturing samples for active sessions based on a pre-defined sampling frequency, the pre-defined sampling frequency defining a uniform time interval and wherein each of the captured samples identifies a type of an activity;
identifying events for each identified type of activity from the captured samples that are active during a sampling time;
determining wait time for each of the identified events;
determining an event count for the active sessions using a harmonic mean of the wait times of the identified events for each type of activity, wherein the harmonic mean is a summation of:
for events having a wait time that is greater than the pre-defined sampling frequency, one per event, and
for events having a wait time that is shorter than the pre-defined sampling frequency, a ratio of the pre-defined sampling frequency to the determined wait time, the harmonic mean computes the event count by estimating for events occurring in the active sessions with wait times shorter than the pre-defined sampling frequency, and including events with wait time greater than the pre-defined sampling frequency within each group; and
outputting the determined event count.

16. The computer program of claim 15, further performing the following operations:
determining whether each of the identified events is completed; and
obtaining the wait time for each completed event.

17. The computer program of claim 15, wherein the operation of determining the event counts for the active sessions includes the following operations,
identifying a type of events from the captured samples based on the identified type of activity;
defining wait time ranges for each of the identified type of events;
grouping the identified type of events based on the defined wait time ranges; and
determining a group event count for each group of the identified type of events using the harmonic mean.

18. A non-transitory computer-readable storage medium storing program instructions, which when executed by one or more processors performs a method, the computer-readable storage medium including:
program instructions for capturing samples for active sessions based on a pre-defined sampling frequency, the pre-defined sampling frequency defining a uniform time interval and wherein each of the captured samples identifies a type of an activity;
program instructions for identifying events for each identified type of activity from the captured samples that are active during a sampling time;
program instructions for determining wait time for each of the identified events; program instructions for grouping the identified events based on the determined wait time according to defined wait time ranges;
program instructions for determining a group event count for each group of the identified events for the active sessions using a harmonic mean of the wait times of the identified events for each type of activity in each group, wherein the harmonic mean is a summation of:
for events having a wait time that is greater than the pre-defined sampling frequency, one per event, and
for events having a wait time that is shorter than the pre-defined sampling frequency, a ratio of the sampling frequency to the determined wait time in each group of the active sessions, the harmonic mean computes the event count by estimating for events occurring in the active sessions with wait times shorter than the pre-defined sampling frequency, and including events with wait time greater than the pre-defined sampling frequency within each group; and program instructions for outputting the determined group event count for each group.

* * * * *